United States Patent
Papadimitriou et al.

(10) Patent No.: US 7,616,609 B2
(45) Date of Patent: Nov. 10, 2009

(54) APPARATUS, AND ASSOCIATED METHOD, FOR SELECTING CODES OF A CODE SET FOR CODING DATA COMMUNICATED DURING OPERATION OF MULTI-ACCESS COMMUNICATION SYSTEM

(75) Inventors: Panayiotis D. Papadimitriou, San Diego, CA (US); Costas N. Georghiades, College Station, TX (US)

(73) Assignee: Nokia, Inc., Irving, TX (US)

( * ) Notice: Subject to any disclaimer, the term of this patent is extended or adjusted under 35 U.S.C. 154(b) by 659 days.

(21) Appl. No.: 10/544,830

(22) PCT Filed: Feb. 11, 2004

(86) PCT No.: PCT/US2004/004217
§ 371 (c)(1),
(2), (4) Date: Jul. 6, 2006

(87) PCT Pub. No.: WO2004/073169
PCT Pub. Date: Aug. 26, 2004

(65) Prior Publication Data
US 2006/0239232 A1    Oct. 26, 2006

Related U.S. Application Data

(60) Provisional application No. 60/447,259, filed on Feb. 13, 2003, provisional application No. 60/474,156, filed on May 29, 2003, provisional application No. 60/517,813, filed on Nov. 5, 2003.

(51) Int. Cl.
*H04B 7/216* (2006.01)
(52) U.S. Cl. .................. 370/335; 375/148; 375/150; 375/152
(58) Field of Classification Search .......... 370/335, 370/342; 375/148, 150, 152, 346
See application file for complete search history.

(56) References Cited

U.S. PATENT DOCUMENTS

| | | | |
|---|---|---|---|
| 6,347,220 B1 * | 2/2002 | Tanaka et al. | 455/277.2 |
| 6,542,536 B1 | 4/2003 | Hershey et al. | |
| 6,628,634 B2 * | 9/2003 | Palenius | 370/335 |
| 2002/0196875 A1 * | 12/2002 | Palenius | 375/346 |
| 2003/0235238 A1 * | 12/2003 | Schelm et al. | 375/148 |
| 2003/0235240 A1 * | 12/2003 | Kawamoto et al. | 375/148 |

OTHER PUBLICATIONS

International Search Report, WO2004/073169 A3, Jul. 21, 2005.

* cited by examiner

*Primary Examiner*—David Q Nguyen
(74) *Attorney, Agent, or Firm*—Alston & Bird LLP

(57) ABSTRACT

Apparatus, and an associated method, for designing codes to be used to code data that is communicated in a multi-access communication system. A selected code is designed, based upon an initial code. The selected code that is designed is of characteristics that best optimize channel differentiation to minimize interference between concurrently-communicated data coded by different codewords of the selected code.

20 Claims, 2 Drawing Sheets

APPARATUS, AND ASSOCIATED METHOD, FOR SELECTING CODES OF A CODE SET FOR CODING DATA COMMUNICATED DURING OPERATION OF MULTI-ACCESS COMMUNICATION SYSTEM

CROSS-REFERENCE TO RELATED APPLICATIONS

The present invention claims the priority of Provisional Patent Application Ser. No. 60/447,259, filed on 13 Feb. 2003, Provisional Patent Application Ser. No. 60/474,156, filed on 29 May 2003, and Provisional Patent Application Ser. No. 60/517,813, filed on 5 Nov. 2003, the contents of which are incorporated herein by reference.

The present invention relates generally to a manner by which to code data to facilitate its communication in a multi-access communication system or, upon a fading channel. More particularly, the present invention relates to apparatus, and an associated method, by which to design the codes to be used to code data in manners to permit concurrent communication of the data on non-orthogonal channels with little interference between the concurrently-communicated data.

Increased numbers of users are able concurrently to communicate within an allocated bandwidth when non-orthogonal, rather than orthogonal, channels, defined by the selected codes, are utilized. An initial code utilized to design a selected that best minimizes interference between concurrently-communicated data, coded by different codewords of the selected code. More efficient utilization of bandwidth allocated to a communication system is possible as more codewords, and increased numbers of channels are used within the allocated bandwidth when the channels need not be fully orthogonal with one another.

BACKGROUND OF THE INVENTION

A communication system operates to provide for the communication of data between communication stations of a set of communication stations. At least one of the communication stations of the set of communication stations forms a sending station. And, at least another of the communication stations of the communication system forms a receiving station. Data is communicated by the sending station to the receiving station by way of a communication channel. If necessary, the sending station converts the data into a from to permit its communication upon the communication channel, and the receiving station operates to detect the data communicated upon the communication channel and to recover the informational content thereof.

Many different types of communication systems have been developed and deployed and many different communication services are effectuable by way of appropriate ones of the communication systems. As advancements in communication technologies shall likely permit the development and deployment of additional types of communication systems, additional communication services shall likely become available. The need for ready access to communication systems, already pervasive, shall likely, therefore, become even more so in the future.

A radio communication system is an exemplary type of communication system. In a radio communication system, the communication channel upon which data is communicated by a sending station to a receiving station is formed of a radio channel defined on a radio link extending between the sending and receiving station. Because data is communicated between the sending and receiving stations upon a radio channel, the need to interconnect the sending and receiving stations by way of a wireline connection is obviated. And, free of the need to interconnect the sending and receiving stations by way of fixed connections, communications by way of a radio communication system are effectuable at, and between, locations at which communications by way of a wireline communication system are not possible. And, a radio communication system is implementable as a mobile communication system in which one or more of the communication stations is permitted mobility.

A cellular communication system is a type of radio communication system. The networks of cellular communication systems have been installed to encompass significant portions of the populated areas of the world. Telephonic communications are effectuable by way of a cellular communication system. Telephonic communications of both voice and data communication services are effectuable by way of a cellular communication system pursuant to communication sessions between the communication stations. Advanced generations of cellular communication systems are permitting of the effectuation of data intensive communication services in which content is communicated between communication stations.

The increasingly data-intensive nature of many communication services taxes the capacities of cellular communication systems, as well as other bandwidth-constrained communication systems. That is to say, bandwidth allocations in cellular, as well as many other, communication systems are limited. And, the communication capacities of such communication systems are regularly limited by the allocations of the bandwidth thereto. Efforts are made, therefore, to utilize, as efficiently as possible, the allocated bandwidth, allocated for use by the communication system.

When the communication system forms a multi-access communication system, i.e., permits multiple communication sessions between multiple sets of communication stations concurrently to be performed, various channel differentiation techniques are utilized. Code-division, multiple-access and frequency division multiplexing techniques are, for instance, utilized.

In a communication system that utilizes code-division, multiple-access (CDMA) techniques, spreading codes are used by which to code data by different ones of the communication stations. Spreading codes are regularly called the codewords of a code with good correlation properties, e.g., the codewords of a Hadamard code are called spreading codes. Channel differentiation is provided by the spreading codes that code the data that is communicated. Conventionally, the spreading codes that are used are mutually orthogonal. When the spreading codes are orthogonal, the resultant coded data coded by the different ones of the spreading codes do not interfere with one another when synchronously communicated.

Analogously, some communication systems that utilize frequency division multiplexing techniques utilize orthogonal frequency division multiplexing (OFDM) techniques in which the channels are defined in manners to be mutually orthogonal with one another. Data communicated upon the orthogonal channels, in single-path conditions, do not interfere with one another. Cellular, and other radio, communication systems, for instance, are sometimes implemented as CDMA or OFDM communication systems.

Definition of the channels to be mutually orthogonal with one another, however, limits the number of channels that can be defined within a given bandwidth. By removing the orthogonality requirement, additional channels, within a given bandwidth, can be defined. However, when the channels no longer are orthogonal, data communicated upon different ones of the channels interfere with one another. If the levels of interference are not significant, the informational content of the concurrently communicated data is recoverable, in spite of the interference introduced by the concurrently communicated data. If a manner could be found by which to provide codes, although not formed of codewords that are mutually orthogonal, that exhibit low levels of cross-correlation among the codewords of the codes, more efficient utilization of the bandwidth allocated to a communication system would be possible.

What is needed, therefore, is a manner by which to design codes that, while not mutually orthogonal, exhibit low levels of cross-correlation between the codeword pairs of each code.

It is in light of this background information related to multi-access communication systems that the significant improvements of the present invention have evolved.

SUMMARY OF THE INVENTION

The present invention, accordingly, advantageously provides apparatus, and an associated method, by which to code data in a multi-access communication system.

Through operation of an embodiment of the present invention, a manner is provided by which to design the codes to be used to code data. The codes are designed in manners to permit concurrent communication of coded data on non-orthogonal channels with little interference between the concurrently communicated data.

Bandwidth allocations in a communication system are better utilized when codes designed pursuant to operation of an embodiment of the present invention are utilized. Increased numbers of users are able concurrently to communicate within an allocated bandwidth when non-orthogonal channels, defined by codes designed pursuant to operation of an embodiment of the present invention, are used to code data and provide channel differentiation. By permitting the codes that define the channels to be non-orthogonal, increased numbers of channels are defined within the allocated bandwidth.

An initial code formed of a first selected number of codewords, each of a second selected length, is used from which to design a selected code, formed of a set of selected codewords. The selected code is formed by modifying the initial code, e.g., by appropriately increasing or decreasing the length of the code. The selected code, and the selected codewords of the selected code are formed in a manner such that the absolute pairwise cross-correlations between the codewords of the code are minimized.

In one aspect of the present invention, cross-correlation calculations are performed upon pairs of portions of the codewords of the initial code. Cross-correlations between the codewords are indicative of the levels of interference between data coded by the codewords of the pair of codewords for which the cross-correlations are determined. In the exemplary implementation, cross-correlations of all of the pairs of the selected portions of the codewords of the initial code are calculated. The cross-correlation values that are calculated for the pairs together form a spectrum of absolute pairwise cross-correlation values. And, the spectrum exhibits a maximum pairwise cross-correlation value. The maximum absolute cross-correlation value is compared with an optimally-attainable value to determine the strength of the code formed by modifying the initial code.

In one aspect, different portions, or different combinations of codewords, forming candidate codes based on the initial code, are analogously analyzed. In another aspect, codes are formed through the disclosed search method, based upon the initial code. That is to say, cross-correlations between the pairs of codewords of the other portions or arrangements of the initial code are determined, the (maximum) absolute pairwise cross-correlation spectrum values are determined, and the comparison is made to the optimally-attainable values thereof.

Subsequent evaluation of the various candidate codes formed of the candidate codes, and their associated closeness to optimally attainable values permit selection of a selected formulation of the initial code to form the selected code.

In one implementation, the codewords of the code define spreading codewords that are used in a CDMA communication system. In another implementation, the codes are selected to be used to provide channel differentiation in a frequency division multiplexed communication system.

In the exemplary implementation, a nested search procedure is performed to search for a code, based upon the initial code, that exhibits the best characteristics. When the best code is selected, the codewords of the selected code are used by which to code data that is to be communicated pursuant to separate communication sessions. Because the code is selected based upon cross-correlation characteristics that, for a given initial code, are as close to optimal as possible, interference between concurrently-communicated data, coded by the selected codewords of the selected code, is minimized for a given initial code, all without requiring that the codewords of the code be orthogonal.

The symbols of the codes of the initial and selected codes are any appropriate, desired values. For instance, the values of the symbols of the code, in one implementation, are binary values. In another implementation, the symbols of the codes form complex values, such as the values of symbols of a QPSK, or other constellation set that is formed of complex values.

In one implementation, a nested search procedure is performed in an iterative manner to form various combinations of codes based upon the initial code. And, a selected code is designed therefrom that exhibits optimal qualities. By selecting the lengths of the codewords of the codes, or, equivalently, the code length, to be less than the cardinality of the code, more users are able to communicate concurrently in a communication system that makes use of such codes than in a conventional system that utilizes orthogonal codes.

In these and other aspects, therefore, apparatus, and an associated method, is provided for a communication system having a selected number of communication stations that selectably communicate coded data. Each communication station selectably codes data communicated therewith by a selected code of a selected code formed of a selected number of codewords. The selected code, based upon an initial code, is designed. The selected code includes codewords that are of code lengths no larger than the selected number of codewords of the selected code. A cross-correlation determiner is adapted to receive indications of the candidate codes. A candidate code former is adapted to receive indications of the initial code. The candidate matrix former forms candidate matrices of at least portions of the initial code. The cross-correlation determiner determines absolute cross-correlations between pairs of at least selected portions of the codewords of the candidate codes. An optimal cross-correlation spectrum value determiner receives indications of cross-correlations determined by the cross-correlation determiner. Optimal cross-correlation spectrum values are determined of the cross-correlations determined by the cross-correlation determiner. A selector is adapted to receive indications of determinations made by the optimal cross-correlation spectrum value determiner. The selector selects the selected code.

Selection made by the selector is responsive to comparison of the optimal cross-correlation spectrum values determined by the optimal cross-correlation value determiner with theoretical optimal values thereof A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
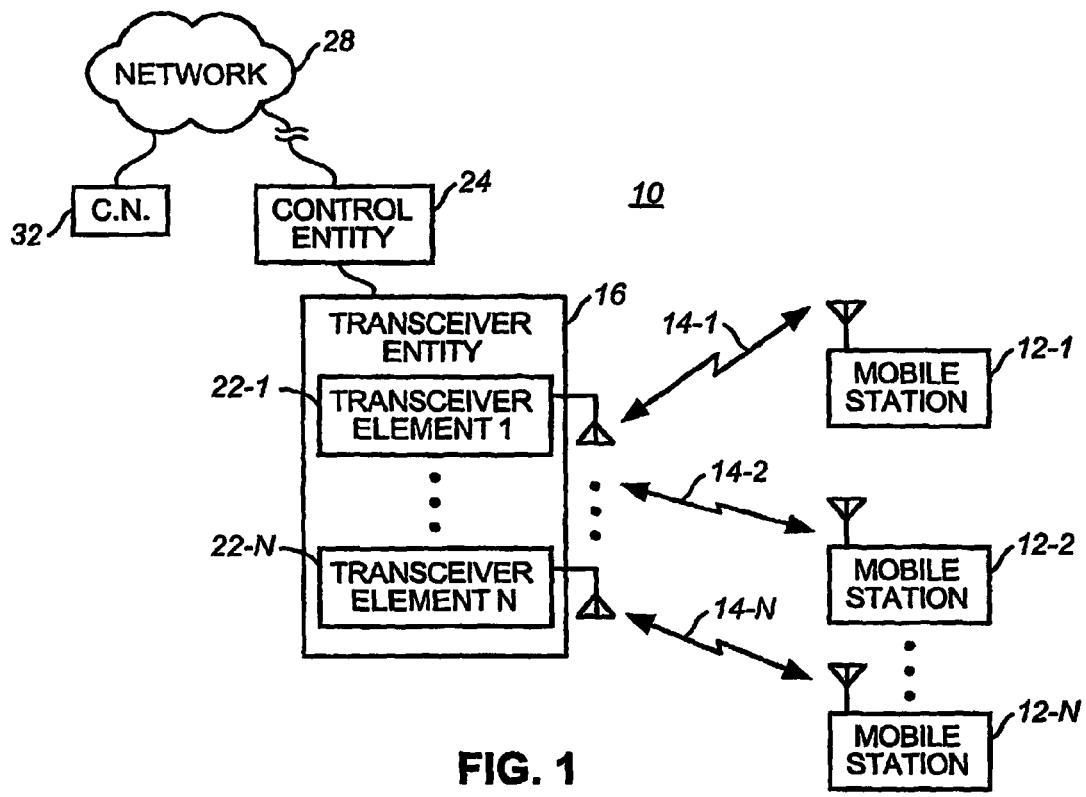
FIG. 1 illustrates a functional block diagram of an exemplary communication system in which an embodiment of the present invention is operable.

Referring first to FIG. 1, a communication system, shown generally at 10, provides for communications between spaced-apart communication stations. Here, the communication system forms a multiple-access radio communication system having a plurality of mobile stations 12 capable of communicating, here by way of point-to-point communications, with a network part of the communication system. Concurrent communications between separate ones of the mobile stations 12 and the network part are effectuable upon separate communication channels defined upon a radio air interface formed between the mobile stations and the network part. The segments 14 shown in the Figure are representative of the communication channels upon which data is communicated between the network part and separate ones of the mobile stations.

While the communication system is represented as a radio communication system, the communication system is also representative of multi-access communication systems that utilize communication channels defined upon wirelines that interconnect different ones of the communication stations theretogether. Accordingly, while the following description of exemplary operation of an embodiment of the present invention shall be described with respect to its implementation in a radio communication system, it should be understood that, in other implementations, the present invention is analogously applicable for use in communication systems other than radio communication systems.

The network part of the communication system includes a fixed-site transceiver entity 16. When the communication system forms a cellular communication system, the transceiver entity 16 forms a base transceiver station. And, when the communication system 10 forms a wireless local area network (WLAN), the transceiver entity forms an access point (AP). In other radio communication systems, the transceiver entity 16 is formed of appropriate structure to perform transceiving operations in the communication system.

The transceiver entity is capable of concurrently communicating with different ones of the mobile stations 12 pursuant to separate communication sessions in which separate data is communicated therebetween. And, the transceiver entity comprises a plurality of transceiver elements 22 that operate to transceive data with separate ones of the mobile stations.

For purposes of illustration, the transceiver element 22-1 transceives data with the mobile station 12-1, the transceiver element 22-2 transceives data with the mobile station 12-2, etc. In the exemplary implementation, the transceiver elements 22 are not in a fixed relation with mobile stations 12, but, rather, the transceiver elements are allocated dynamically to communicate with different ones of the mobile stations when data is to be communicated by, and with, a mobile station pursuant to a communication session.

The network part of the communication system also includes a control entity 24, such as a radio network controller, a network hub, or the like. The control entity 24 operates to perform various control operations over the communications in the portion of the communication system over which the control entity exerts control.

The control entity, in turn, is coupled by way of structure (not shown) with an external network 28. And, the network 28 is coupled to communication nodes, of which the communication node 32 is representative. End-to-end communications are effectuable between a correspondent node and a mobile station by way of communication paths formable through the network part of the communication system and by way of radio channels extending between the network part and the mobile station.

Because of the multi-access nature of the communication system, selection of the communication channels upon which the data is communicated, such as here by way of the radio channels defined upon the radio air interface, must be made to minimize the occurrence of interference between data communicated concurrently on different ones of the channels. Various schemes are conventionally utilized by which to define and form channels, best to minimize interference therebetween when data is communicated concurrently on separate ones of the channels.

For instance, orthogonally-defined channels are used in some conventional communication systems. The orthogonally is maintained in single paths. CDMA (Code Division Multiple Access) communication schemes conventionally utilize orthogonal spreading codes, and orthogonal frequency division multiplexed (OFDM) communication systems that utilize mutually orthogonal frequencies at which the channels are defined. OFDM can be considered as a fully-bounded CDMA system having complex-valued spreading codes that are, e.g., the codewords of the IDFT code, i.e., the IDFT matrix. In both schemes, as well as various others, codes are utilized by which to define the channel differentiation.

The conventional utilization of orthogonal codes, however, limits the number of channels that can be defined at a particular code length. That is to say, the number of orthogonal codewords of the codes is a function of the code lengths. When a maximum number of orthogonal codewords, of particular code lengths, are used, the only manner by which to increase the number of orthogonal codewords of the codes is to increase the code lengths. Processing requirements to operate upon coded data, coded by the codes of the increased code lengths, correspondingly increases. And, significantly, increased code lengths required increased bandwidth allocations. There is a practical limitation, therefore, on the number of orthogonal channels that can be practically used in a communication system due to the increased processing requirements and increased bandwidth requirements of lengthier code lengths.

An embodiment of the present invention provides a manner by which to design codes that are formed of codewords, are not mutually orthogonal with one another but that, when used to code data that is concurrently communicated, permits the data to be communicated with minimal interference caused by concurrent communication of the data.

Figure 2:
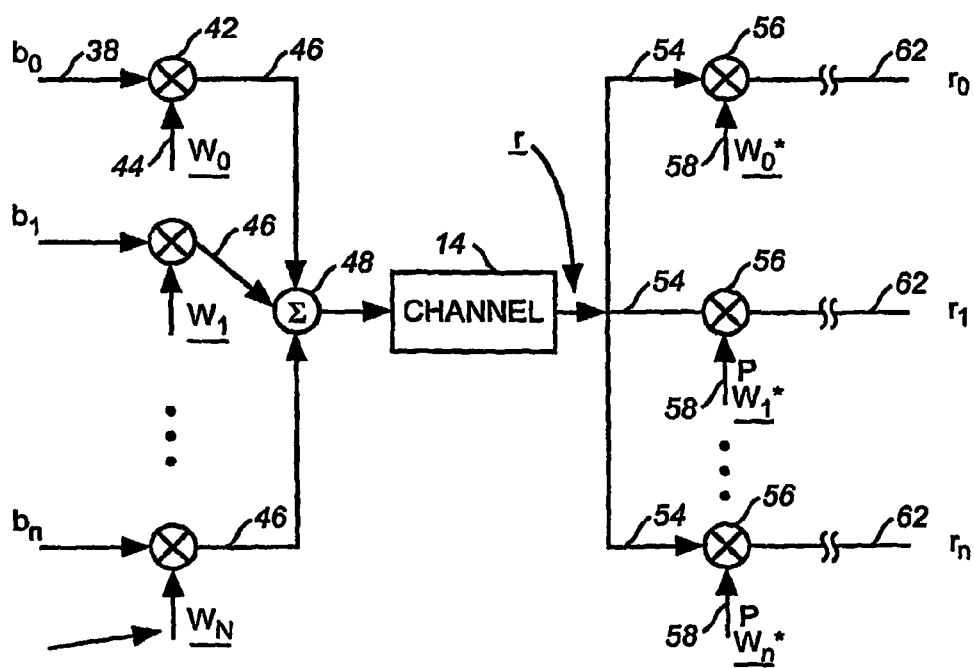
FIG. 2 illustrates a representation of a model of the communication system shown in FIG. 1.

FIG. 2 illustrates a model of a portion of the communication system 10 shown in FIG. 1. The model represents communication of data originated at the transceiver elements 22 of the transceiver entity for communication to a plurality of the mobile stations 12. An analogous model can be shown to represent the communication of data originated at a plurality of mobile stations for communication to the transceiver elements of the transceiver entity.

Data that is to be communicated is designated by the letter 'b' applied on the lines 38 to mixer elements 42. Codewords of codes, designated by the letter 'w', are also applied, by way of lines 44 to the mixers 42. The codewords are also referred to as spreading codes.

Mixing operations are performed by the mixers 42, and coded data is formed as a result of the mixing operations. The coded data is generated on the lines 46. The lines 46 extend to a summing element 48. The summing element sums together the coded data formed upon each of the lines 46 to form a summed representation that is communicated by way of the radio air interface 14 to the mobile stations 12.

At the mobile stations 12, the received data, here the summed data, is operated upon by each of the mobile stations. The summed data is provided, by way of the lines 54, to mixer elements 56 that are also coupled to corresponding spreading codes by way of the lines 58. Mixing operations, analogous to, but generally complex-conjugated to that of, the operations performed at the mixers 42 are performed to decode the data provided to the mixers 56. Other entities (not shown) of the mobile stations, ultimately to recover receive representations r of the transmitted data on the lines 62.

Operation of an embodiment of the present invention designs the codes whose codewords "w" are used to code the data and to provide channel differentiation to define the channels that are used in the communication system to communicate data between the communication stations thereof. An initial code, formed of an initial set of codewords is used from which to form a selected code, formed of selected codewords that are used to code the data and to provide the channel differentiation. The codes' lengths are of lengths less than the number of codewords, and the codewords therefore of each code are not all mutually orthogonal. However, through operation of an embodiment of the present invention, the selected code is selected to optimize best, for an initial code, the selected code to minimize interference between channels so-defined.

Figure 3:
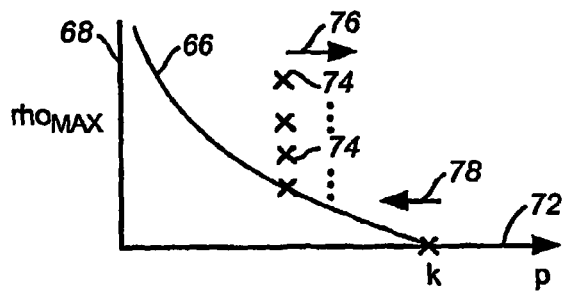
FIG. 3 illustrates a graphical representation of the relationship between a minimum obtainable maximum absolute cross-correlation spectrum value as a function of code length.

FIG. 3 illustrates a graphical representation, shown generally at 66, that plots a value $\rho_{max}$ 68 as a function of code length 72. The value $\rho_{max}$ identifies maximum absolute cross-correlations between pairs of codewords of a code. At a code length k, the value of $\rho_{max}$ is 0. At this value, the codewords of the code are mutually orthogonal provided also that the cardinality of the code is at most k. At lesser code lengths, i.e., when p is less than k*, $\rho_{max}$ is of a value of greater than 0 and defines the plot 66. The letter "p" represents code length. The plot 66 represents the optimal-attainable value of $\rho_{max}$ for a code of a selected code length and cardinality. During operation of an embodiment of the present invention, the selected code that is designed, based upon an initial code, is the code that most closely approaches the optimally-obtainable value of $\rho_{max}$ or the code having the optimal cross-correlation spectrum among the spectra of a sample of codes. During operation, successive iterations of codes are formed and analyzed to compare the characteristics of the created codes relative to the optimally obtainable value of $\rho_{max}$. The designation 'x', designated at 74, here represents four codes formed of codewords that form candidate codes, i.e., candidates to form the selected code.

The initial code formed of the initial codewords is modified pursuant to different embodiments of the present invention. In one embodiment, a forward nesting procedure is utilized by which to increase the code length of the initial code. This type of nesting procedure is indicated by the arrow 76 in the figure. In another implementation, backward nesting procedures are utilized by which a selected code is formed by reducing the length of the initial code that initially are of code length k. Backward nesting is represented in the figure by the arrow 78.

Figure 4:
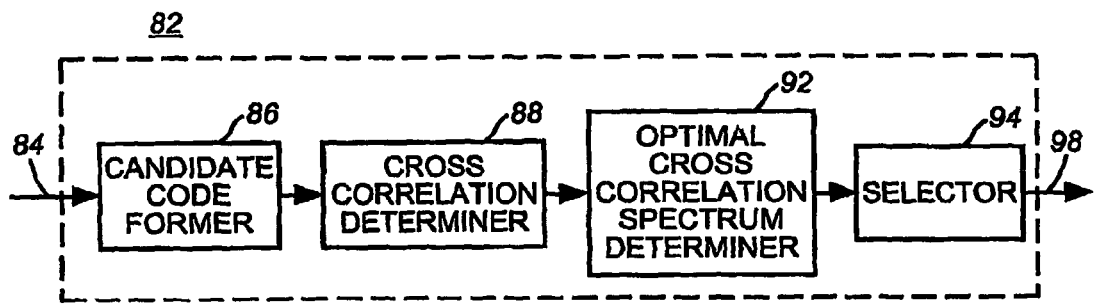
FIG. 4 illustrates a functional block diagram of the apparatus of an embodiment of the present invention.

FIG. 4 illustrates apparatus, shown generally at 82, of an embodiment of the present invention that designs the selected code, i.e., selected code matrix, by which to code data to permit concurrent communication of the data on separate channels with minimal interference between the concurrently communicated data on the separate channels. Note also that the (block) code can be considered as a matrix whose rows are the codewords. The apparatus is formed of functional entities, implementable in any manner, such as by algorithms executable by processing circuitry. In one implementation, the apparatus is embodied at the network part of the communication system, such as at the control entity 24 (shown in FIG. 1). Indications of an initial code, formed of a set of initial codewords are provided to the apparatus, here by way of the line 84. The indications are provided to a candidate code former 86. The candidate code former operates to form candidate codes, such as through use of the forward nesting or backward nesting procedure just-described. Enhanced nesting procedures, or other manners by which to form the candidate codes, are used in alternate implementations.

Indications of the candidate codes formed by the candidate code former are provided to a cross-correlation determiner 88. The cross-correlation determiner performs calculations to determine the pairwise absolute cross-correlations between codewords of each of the codes formed by the code former. For each code, a cross-correlation spectrum is formable. Indications of the cross-correlations determined by the determiner 88 are provided to an optimal cross-correlation spectrum determiner 92. The optimal cross-correlation spectrum value determiner operates to determine, for each candidate code upon which the cross-correlations are performed, the maximum cross-correlation of the cross-correlation spectrum of that matrix, as well as the optimal cross-correlation spectrum among the code's spectra searched. And, indications of the determinations are provided to a selector 94. The selector operates to select the candidate code that exhibits the properties most closely approaching the optimal properties, such as that represented by the representation 66 shown in FIG. 3 as the selected code formed of the selected codewords. Indications of selection by the selector are formed on the line 98. The codewords formed on the line 98 are, for instance, used at the transceiver entity 24 and mobile stations 12 (shown in FIGS. 1 and 2) to code data communicated during operation of the communication system.

The initial code, and the candidate codes formed therefrom, are of any appropriate symbol values depending upon the type of communication system in which the coding is to be utilized. For instance, binary symbols, real, imaginary, and complex symbols, are all exemplary of the symbol types of the symbols forming codewords of the initial, candidate, and selected codes. In a forward nesting procedure, column vectors are added to the initial code. In an exemplary implementation, a code vector is appended, or otherwise added to, the initial code and determination is made of the optimal code vector. In a scheme that utilizes binary symbols, $2^M$ possible formulations of a code vector are possible where M is the vector size. And, successive iterations of additions of additional code vectors to the initial code are performed to define a code of a desired code length. In an enhanced forward nesting procedure, multiple columns are added to the initial, or prior, code in each iterative step.

In a backward nesting procedure, a code vector is removed from the initial code. At each step of the iteration, a determination is made of which of the code vectors of the code to remove. And, in an enhanced, backward nesting procedure, multiple columns are deleted from the initial, or prior, code at each iteration.

Mathematically, a forward nesting searching procedure is, in an exemplary implementation, performed using the following search procedure:

An exemplary nested search that is used to find the best complex code $C'_{M,n}$, starting from a known $C_{M,\xi}$ code ($\xi$<n) is summarized below:

1) Set j=$\xi$+1.
2) Search over the possible $C_{M,j}$=[$C_{M,j-1}$, c] codes, to yield the best code $C'_{M,j}$ having the optimal p-spectrum over all the yielded spectra of the search.
3) Set $C_{M,j}$=$C'_{M,j}$.
4) Set j=j+1.
5) If j>n Stop, else go to Step 2.

Step 2 of the nested search is performed in any of a number of ways. Here, the complex vector c is a column of the $C_{M,M}$ code where $C_{M,M}$ is a unitary or orthogonal matrix, e.g., DFT and IDFT matrix.

$C_{M,n}$ denotes a code C having cardinality M and length n.

Since the nested search requires a known $C_{M,\xi}$ which result from the full over-the-columns search, or for low complexity, one can use the code $C_{M,1}$ ($\xi$=1), which is just the first column of $C_{M,M}$.

The aforementioned nested search proceeds forward. Likewise, a backward nested search can alternately be performed beginning from a $C_{M,M}$ code and in each iteration an appropriate column is removed to obtain the desired $C_{M,n}$ code (n<M).

In the sequel, when the backward nested search is used, it will be stated explicitly, not to be confused with the nested search whose name will be reserved for the forward version analyzed previously.

Similar to the nested search, the backward nested search steps are as follows:

1) Set j=M-1.
2) Search over the possible $C_{M,j}$=$C_{M,j+1}$\{c} codes, where c a column of $C_{M,j+1}$, to yield the best code $C'_{M,j}$, having the optimal cross-correlation spectrum over all the yielded spectra of the search.
3) Set $C_{M,j}$=$C'_{M,j}$.
4) Set j=j-1.
5) If j<n Stop, else go to Step 2.

Figure 5:
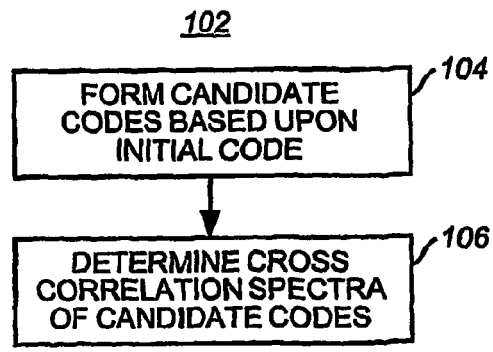
FIG. 5 illustrates a method flow diagram listing the method of operation of an embodiment of the present invention.

FIG. 5 illustrates a method, shown generally at 102, representative of the method of operation of an embodiment of the present invention. The method designs a selected code based upon an initial code. The selected codes are of code lengths no larger than their cardinality.

First, and as indicated by the block 104, candidate codes are formed of at least portions of the initial code. Then, and as indicated by the block 106, the cross-correlation spectrum of each candidate code is determined.

Thereby, through operation of an embodiment of the present invention, codes are designed to increase the number of channels that are available for use using codes of selected code lengths while minimizing the interference between data concurrently generated that is coded by different ones of the codewords of the codes. Increased communication capacity within a given allocated bandwidth is thereby obtainable, as compared to use of orthogonal or unitary codes.

The previous descriptions are of preferred examples for implementing the invention, and the scope of the invention should not necessarily be limited by this description. The scope of the present invention is defined by the following claims.

What is claimed is:

1. In a communication system having a selected number of communication stations selectably for communicating coded data, each communication station selectably for coding data communicated therewith by a selected codeword of a selected code formed of a selected number of codewords, an improvement of apparatus for designing the selected code based upon an initial code, the selected code of code lengths no larger than the selected number of codewords of the selected code, said apparatus comprising:

a candidate code former adapted to receive indications of the initial code, said candidate code former for forming candidate codes of at least portions of the initial code;

a cross-correlation determiner adapted to receive indications of candidate codes formed by said candidate code former, said cross-correlation determiner for determining cross-correlations between pairs of codewords of the candidate codes;

an optimal cross-correlation spectrum value determiner adapted to receive indications of cross-correlations determined by said cross-correlation determiner, said optimal cross-correlation spectrum value determiner for determining optimal cross-correlation spectrum values of the cross-correlations determined by said cross-correlation determiner;

a selector adapted to receive indications of determinations made by said optimal cross-correlation spectrum value determiner, said selector for selecting a selected candidate code to form the selected code, selection made by said selector responsive to comparison of the optimal cross-correlation spectrum values determined by said optimal cross-correlation spectrum value determiner with optimal values thereof.

2. The apparatus of claim 1 wherein the selected code selected by said selector to form the selected code comprise sequences of binary values.

3. The apparatus of claim 1 wherein the selected code selected by said selector to form the selected code comprise sequences of complex values.

4. The apparatus of claim 1 wherein determinations made by said cross-correlation determiner comprise cross-correlations of at least metrical portions of the candidate codes.

5. The apparatus of claim 4 wherein the determinations made by said cross-correlation determiner comprise cross-correlations of a first matrical portion of a first candidate code and cross-correlations of a second matrical portion of a second candidate code.

6. The apparatus of claim 5 wherein said optimal cross-correlation spectrum value determiner is adapted to receive indications of first cross-correlations of the first matrical portion of the first candidate code and indications of at least second cross-correlations of the at least the second matrical portion of the second candidate code, said optimal cross-correlation spectrum value determiner for determining optimal cross-correlation spectrum values of the first and at least second cross-correlations of the first and at least second matrical portions of the first and second candidate codes.

7. The apparatus of claim 6 wherein selection made by said selector of the selected code is of a selected one of the first matrical portion of the first candidate code and the at least the second matrical portion of the second candidate code.

8. The apparatus of claim 7 wherein said cross-correlation determiner, said optimal cross-correlation spectrum value determiner, and said selector are iteratively operable responsive to application to said cross-correlation determiner of each of the first and at least second matrical portions of the first and at least second candidate codes.

9. The apparatus of claim 5 wherein the indications of the first matrical portion and the at least the second matrical portions are sequentially applied to said cross-correlation determiner and wherein determinations made by said cross-correlation determiner are sequentially made upon each of the first and at least second matrical portions.

10. The apparatus of claim 4 wherein the at least metrical portions of the candidate codes of which said cross-correlation determiner determines the cross-correlations comprise super-matrices that are formed of an initial-set matrix formed of the initial code and at least an additional vector set.

11. The apparatus of claim 4 wherein the at least metrical portions of the candidate codes of which said cross-correlation determiner determines the cross-correlations comprises sub-matrices that are formed of sub-matrical parts of an initial-set matrix formed of the initial code.

12. The apparatus of claim 1 wherein the optimal values with which the optimal cross-correlation spectrum values are compared are optimal values for the code lengths of the selected code.

13. The apparatus of claim 1 wherein the communication system utilizes a code-division multiple-access communication scheme and wherein the selected code selected by said selector to form the selected code forms a spreading code that define channels in the code-division communication scheme.

14. The apparatus of claim 1 wherein the communication system utilizes a frequency division multiplexing communication scheme and wherein the selected code selected by said selector to form the selected code define channels in the frequency division multiplexing communication scheme.

15. In a method of communicating in a communication system having a selected number of communication stations selectably for communicating coded data, each communication station selectably for coding data communicated therewith by a selected codeword of a selected code formed of a selected number of codewords, an improvement of a method for designing the selected code based upon an initial code, the selected code of code lengths no larger than the selected number of codewords of the selected code, said method comprising:
   forming candidate codes of at least portions of the initial set of codes;
   determining cross-correlation between codewords of the candidate codes;
      determining optimal cross-correlation spectrum values of the cross-correlations determined during said operation of determining the cross-correlations; and
   selecting the selected codewords to form the selected code responsive to comparison of the maximum cross-correlation spectrum values determined during said operation of determining the maximum cross-correlation spectrum values with optimal values thereof.

16. The method of claim 15 wherein said operation of determining the cross-correlations comprises determining cross-correlations upon a first matrical portion of a first candidate code and at least a second matrical portion of at least a second candidate code.

17. The method of claim 16 wherein said operation of determining the optimal cross-correlation spectrum values comprises determining the optimal cross-correlation spectrum values associated with the first matrical portion and associated with the at least the second matrical portion.

18. The method of claim 17 wherein said operation of selecting comprises selecting one of the first matrical portion and the at least the second matrical portion to form the selected code.

19. The method of claim 18 wherein said operations of determining the cross-correlation, determining the cross-correlation, determining the optimal cross-correlation spectrum values, and selecting are iteratively performed responsive to each of the first and at least second sub-matrical portions.

20. The method of claim 18 wherein the candidate codes formed during said operation of forming the candidate codes are of sizes greater than an initial-matrix size formed of the initial code.

* * * * *

UNITED STATES PATENT AND TRADEMARK OFFICE
CERTIFICATE OF CORRECTION

PATENT NO. : 7,616,609 B2  Page 1 of 1
APPLICATION NO. : 10/544830
DATED : November 10, 2009
INVENTOR(S) : Papadimitriou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this

Nineteenth Day of October, 2010

David J. Kappos
*Director of the United States Patent and Trademark Office*